US007168740B2

(12) United States Patent
Kobayashi et al.

(10) Patent No.: US 7,168,740 B2
(45) Date of Patent: Jan. 30, 2007

(54) STRUCTURE OF MOUNTING WEIGHT IN FORKLIFT TRUCK

(75) Inventors: Hiroshi Kobayashi, Kariya (JP); Shuo Uematsu, Kariya (JP); Takahito Miyake, Kariya (JP); Tomomichi Miura, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 247 days.

(21) Appl. No.: 10/810,238

(22) Filed: Mar. 26, 2004

(65) Prior Publication Data

US 2004/0216299 A1 Nov. 4, 2004

(30) Foreign Application Priority Data

Mar. 27, 2003 (JP) ............................ 2003-089251

(51) Int. Cl.
*B60S 9/00* (2006.01)

(52) U.S. Cl. ...................... 280/759; 212/178; 212/195

(58) Field of Classification Search ................ 280/757, 280/758, 759; 212/178, 195; *B66F 9/06*
See application file for complete search history.

(56) References Cited

U.S. PATENT DOCUMENTS

| | | | | |
|---|---|---|---|---|
| 2,925,149 | A * | 2/1960 | Hughson | 187/222 |
| 3,023,024 | A * | 2/1962 | McAdams et al. | 280/759 |
| 3,032,352 | A * | 5/1962 | Barrett | 280/759 |
| 3,061,034 | A * | 10/1962 | Hoyt | 180/68.5 |
| 3,135,404 | A * | 6/1964 | Pilch | 414/719 |
| 3,217,825 | A | 11/1965 | Hauxwell et al. | 180/68.5 |
| 3,730,545 | A * | 5/1973 | Allori | 280/759 |
| 3,853,231 | A * | 12/1974 | Luttrell | 414/719 |
| 4,068,876 | A * | 1/1978 | Muellner | 293/106 |
| 4,502,709 | A * | 3/1985 | Schaeff | 280/758 |
| 5,833,268 | A * | 11/1998 | Aldrovandi | 280/759 |
| 6,471,245 | B1 * | 10/2002 | Schott | 280/759 |

FOREIGN PATENT DOCUMENTS

| | | |
|---|---|---|
| JP | 56-71673 | 6/1981 |
| JP | 62-167197 | 7/1987 |
| JP | 01317879 A * | 12/1989 |
| JP | 05-330458 | 12/1993 |
| JP | 2000-63095 | 2/2000 |
| JP | 2001-151487 | 6/2001 |
| JP | 2002-211895 | 7/2002 |

* cited by examiner

*Primary Examiner*—Paul N. Dickson
*Assistant Examiner*—Leonard McCreary, Jr.
(74) *Attorney, Agent, or Firm*—Morgan & Finnegan LLP

(57) ABSTRACT

A structure of mounting a weight in a forklift truck which has a frame and the weight that is to be connected and fixed to the frame by a bolt and a nut includes a first hole, a second hole, a first fitting part and a second fitting part. The first hole is formed through the frame. The second hole is formed through the weight in such a manner that the first hole and the second hole correspond to each other. The first fitting part is formed on the frame. The second fitting part is formed on the weight in such a manner that the first fitting part and the second fitting part fit to each other and that the first hole and the second hole are aligned with each other when the frame and the weight are combined together.

16 Claims, 3 Drawing Sheets

STRUCTURE OF MOUNTING WEIGHT IN FORKLIFT TRUCK

BACKGROUND OF THE INVENTION

The present invention relates to a forklift truck comprising a frame, a weight and a mounting structure for mounting the weight, and furthermore relates to a method of mounting a weight in a forklift truck.

A forklift truck has a counterweight or a balance weight made of a casting and mounted in the rear of a body frame of the vehicle for balancing the vehicle when the vehicle is loaded. The counterweight or the balance weight is hereinafter referred to as a weight. The weight is conventionally connected to the frame by a plurality of bolts and nuts. Since the mating surfaces of the weight and the body frame to which the weight is connected extend substantially vertically, the plurality of bolts needs to be inserted into their respective bolt receiving holes while supporting the heavy weight and also adjusting the weight for its connecting position with respect to the vehicle body frame. Thus, the operation of connecting the weight is laborious and time-consuming work.

Document JP 2001151487 A discloses a method of connecting a weight to a frame, which reduces the time and effort for connecting the weight to the frame. In this reference, a mounting part is formed on a rear axle frame that extends rearward from the frame. The weight is mounted on the mounting part. Specifically, the weight is mounted on the mounting part of the rear axle frame temporarily and then the position of the weight is adjusted by moving the weight in vertical, horizontal and lateral directions in such a manner that bolts provided in the frame coincide with bolt-holes formed in the weight. Then the bolts are inserted into the respective bolt-holes. Subsequently, the bolts are tightened by their nuts. Thus, the weight is connected to the frame.

According to the above document, the weight is connected to the frame in a state that the weight is mounted on the mounting part. However, the bolts still need to be inserted into the bolt-holes while the position of the weight is being adjusted. Consequently, the time and effort for connecting the weight to the frame is not sufficiently reduced.

Also, since the forklift truck whose rear axle is mounted on the weight does not have any part for supporting the weight, extra time and effort is required when connecting the weight to the frame. In addition, for the purpose of supporting the weight, a large-sized jig or equipment is required.

SUMMARY OF THE INVENTION

It is an object of the present invention to provide a forklift truck comprising a mounting structure for mounting a weight that reduces time and effort in connecting the weight to a frame of the forklift truck. Furthermore, it is an object of the present invention to provide an improved method of mounting a weight in a forklift truck.

The present invention has the following first feature. In forklift truck which has a frame, weight and a mounting structure for the weight on the frame, the mounting structure comprises a first hole, a second hole, a first fitting part and a second fitting part. The first hole is formed through the frame. The second hole is formed through the weight. The first fitting part is formed on the frame. The second fitting part is formed on the weight in such a manner that the first fitting part is fittingly received in the second fitting part. The first hole is formed in the first fitting part and the second hole is formed in the second fitting part such that the first hole and the second hole are aligned with each other when the first fitting part is fittingly received in the second fitting part. A bolt is inserted through the first and second holes and a nut is screwed on the bolt for tightening. The first fitting part comprises a horizontal top portion, a first contacting portion which continues from a rear end of the top portion and extends downward and a second contacting portion. The second fitting part comprises a first bearing surface that contacts the first contacting portion and a second bearing surface that contacts the second contacting portion. The second contacting portion continues from a lower end of the first contacting portion and extends horizontally forward. The second fitting part further comprises a third bearing surface that contacts all three portions of the first fitting part.

The present invention has the following second feature. A method of mounting a weight in a forklift truck which comprises a frame and the weight that is to be connected and fixed to the frame by a bolt and a nut includes a first forming step of forming a first hole through the frame and a second hole through the weight in such a manner that the first hole and the second hole correspond to each other and a second step of forming a first fitting part on the frame and a second fitting part on the weight in such a manner that the first fitting part and the second fitting part fit to each other. The first hole is formed in the first fitting part and the second hole is formed in the second fitting part such that the first hole and the second hole are aligned with each other when the frame and the weight are combined together. The second forming step comprises (i) forming the first fitting part to have a horizontal top portion, a first contact portion that continues from a rear end of the top portion and extends downward and a second contacting portion and (ii) forming the second fitting part to have a first bearing surface to be brought into contact engagement with the second contacting portion. The method also includes a step of moving the frame and the weight to each other in such a manner that the first fitting part is fittingly received in the second fitting part fit to each other, and a step of inserting the bolt through the first hole and the second hole from the weight side and tightening the bolt with the nut. The second forming step further comprises (i) forming a second contacting portion of the first fitting part such that it continues from a lower end of the first contacting portion and extends horizontally forward and (ii) forming the second fitting part to have a third bearing surface to be brought in contact engagement with all three portions of the first fitting part.

The aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A forklift truck according to a preferred embodiment of the present invention will now be described with reference to FIGS. 1 through 5.

Figure 1:
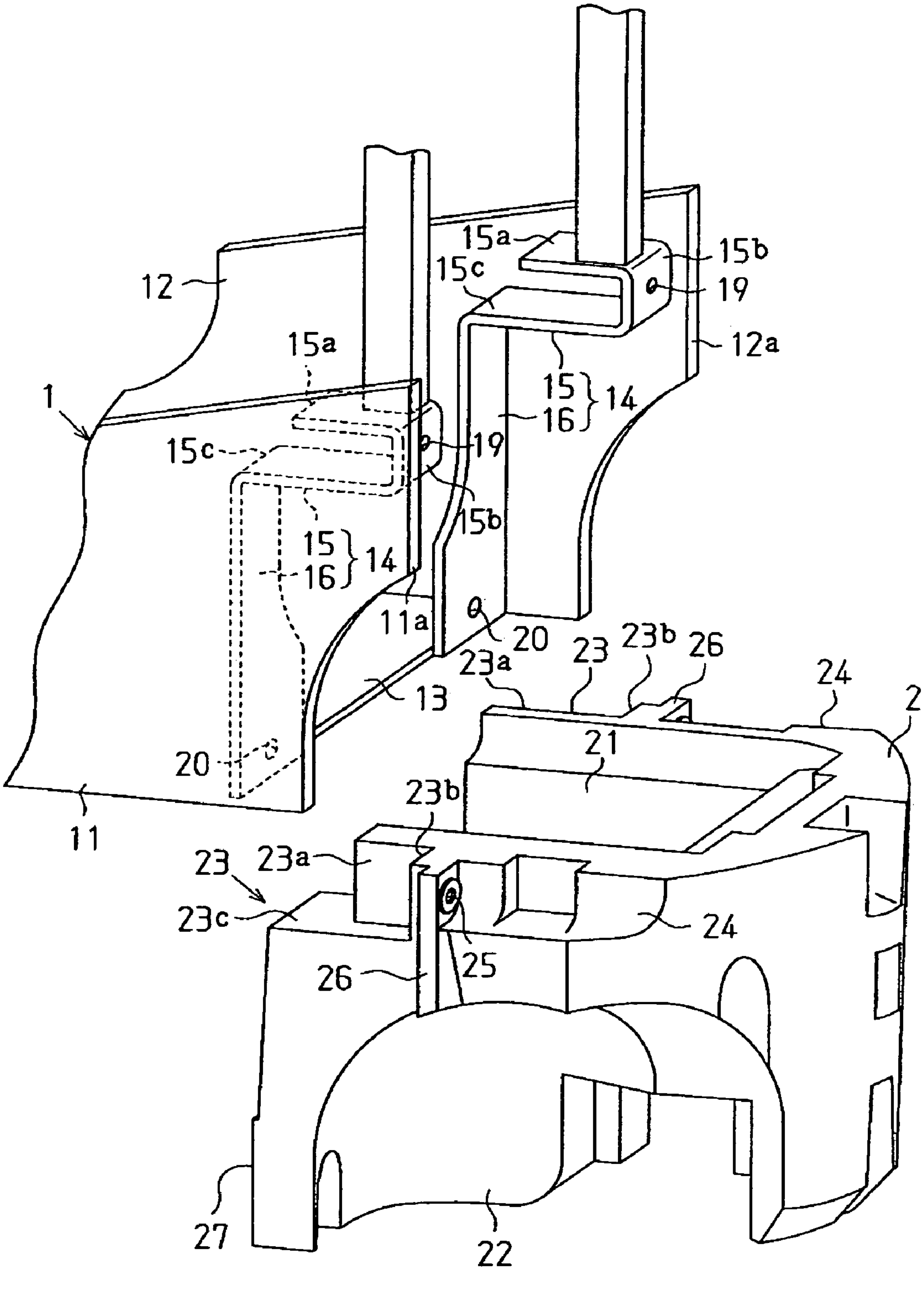
FIG. 1 is a partial perspective view showing a frame and a weight that is to be connected to the frame.

In FIG. 1, the left side of the figure is the front side and the right side thereof is the rear side. As shown in FIG. 1, a frame 1 of a forklift truck includes a left side-plate 11, a right side-plate 12 and a base plate 13. The left side-plate 11, the right side-plate 12 and the base plate 13 cooperate to define a space for accommodating therein various devices and equipment. Locating members 14 are fixed to the internal surfaces of the left side-plate 11 and the right side-plate 12 adjacent to the rear end of the frame 1, respectively. Each locating member 14 has a fitting part 15 and a bearing part 16 that extends downward from the fitting part 15. The fitting part 15 of each locating member 14 is bent substantially in J-shape, including a horizontal top portion 15*a*, a first contacting portion 15*b* continuing from the rear end of the top portion 15*a* and extending downward, and a second contacting portion 15*c* continuing from the lower end of the first contacting portion 15*b* and extending horizontally forward. The top portion 15*a*, the first contacting portion 15*b* and the second contacting portion 15c of the fitting part 15 are formed so as to have substantially the same dimension as measured in the direction of the width of the forklift truck. As shown in FIG. 1, an upper bolt receiving hole 19 is formed through each first contacting portion 15*b*.

The bearing part 16 of each locating member 14 extends vertically downward from the front end of the horizontal second contacting portion 15*c* of the fitting part 15. A lower bolt receiving hole 20 is formed through the lower part of each bearing part 16.

Meanwhile, a weight 2 is shaped so as to form in the center thereof a recess 21 for accommodating therein various devices and equipment. The recess 21 is opened to the top and the side adjacent to the frame 1. The weight 2 is also shaped so as to form on opposite sides thereof a pair of recesses 22 opened not only to lateral sides but also to the rear of the weight 2 for receiving therein rear wheels (not shown), respectively.

The weight 2 is formed at the upper front surfaces on opposite sides thereof with the fitting parts 23 which are symmetrical with respect to the longitudinal center line of the weight 2. Each fitting part 23 of the weight 2 is shaped in a recessed form so as to fittingly receive therein the corresponding J-shaped fitting part 15 of the frame 1. As shown in FIG. 1, the fitting part 23 includes a first bearing surface 23, a second bearing surface 23 and a third bearing surface 23. These bearing surfaces 23*a*, 23*b*, 23*c* are formed such that, when the fitting part 15 of the frame 1 is fitted or received in the recess of the fitting part 23 of the weight 2, the third bearing surface 23*a* is brought into contact engagement with the lateral surfaces of the three portions 15*a*, 15*b*, 15*c* of the J-shaped fitting part 15 of the frame 1, the first bearing surface 23*b* with the rear surface of the first contacting portion 15*b* of the fitting part 15, and the second bearing surface 23*c* with the bottom surface of the second contacting portion 15*c* of the fitting part 15, respectively.

A fitting recess 24 is formed in the weight 2 behind each fitting part 23 and an upper bolt receiving hole 25 is formed in the weight 2 adjacent to the fitting part 23 so as to extend from the first bearing surface 23*b* to the fitting recess 24. The upper holes 25 and their corresponding upper holes 19 in the first contacting portion 15*b* are aligned with each other so as to receive therethrough locking bolts B, respectively, when the fitting parts 15 are received in the respective fitting parts 23.

Figure 2:
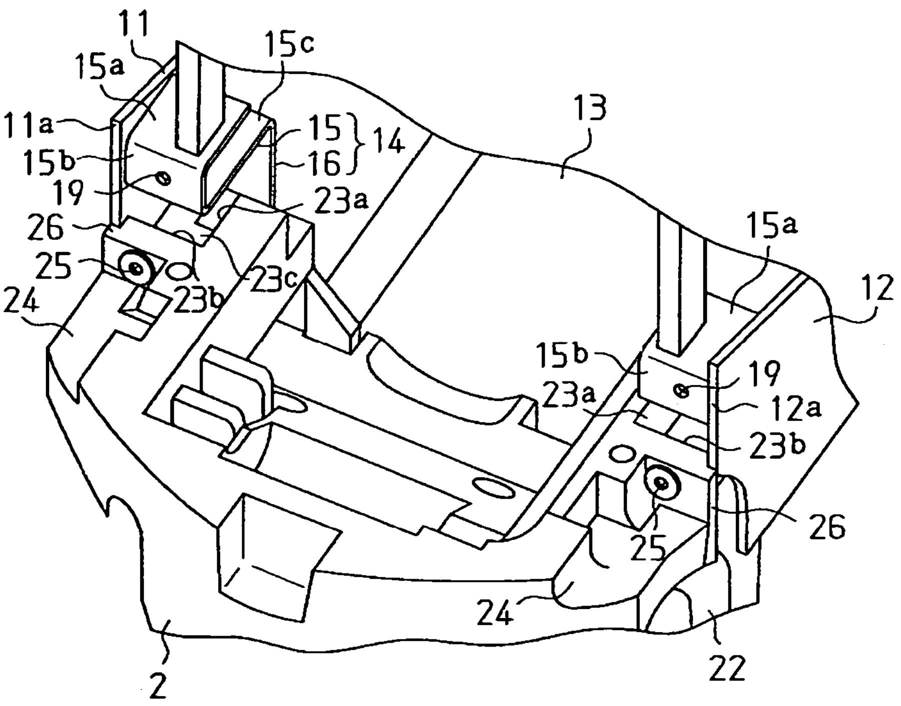
FIG. 2 is a partial perspective rear view showing the frame and the weight that is to be connected to the frame.

A wall is formed between each fitting part 23 and its corresponding fitting recess 24 and an engaging part 26 extends externally from the outer side face of each such wall. Rear ends 11*a*, 12*a* of the left and right side-plates 11, 12 are placed so as to face their adjacent engaging parts 26, as shown in FIG. 2, when the fitting parts 15 of the frame 1 are received in their corresponding fitting parts 23 of the weight 2, respectively.

Fourth bearing surfaces 27 are formed on the opposite front faces of the weight 2 (only one such bearing surface being shown in FIG. 1) in such a manner that the bearing parts 16 of the locating members 14 contact the fourth bearing surfaces 27 when the fitting parts 15 are fitted in the fitting parts 23 of the weight 2, respectively.

Figure 3:
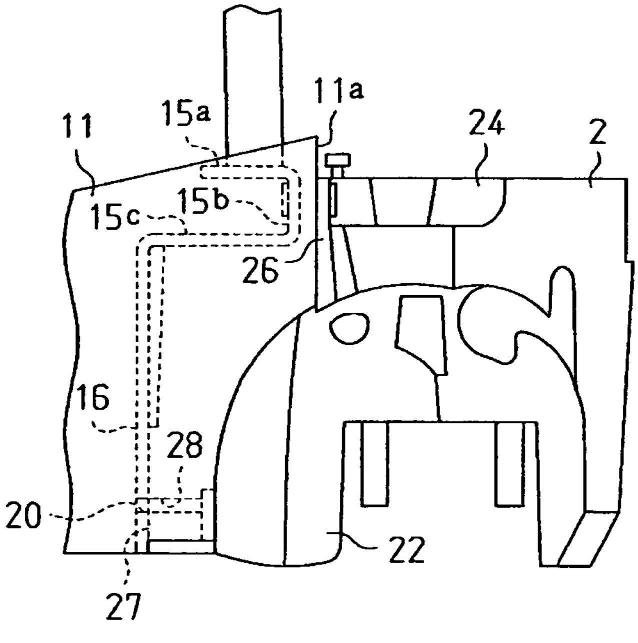
FIG. 3 is a side view showing the weight that has been connected to the frame.
Figure 4:
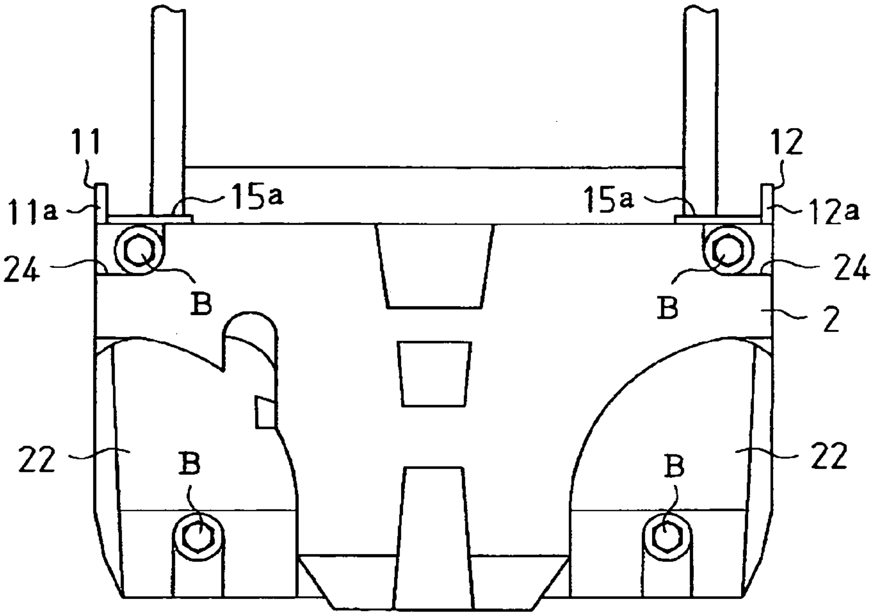
FIG. 4 is a front view showing the weight that has been connected to the frame.
Figure 5:
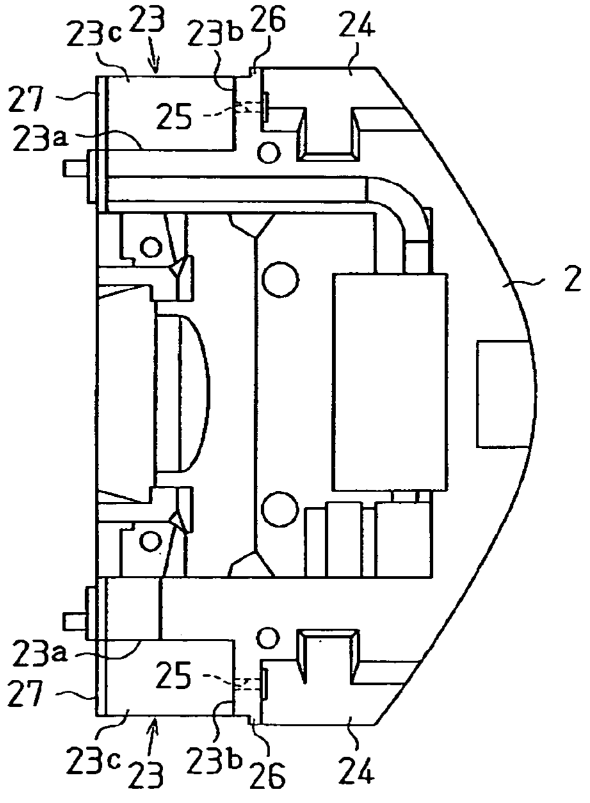
FIG. 5 is a top view showing the weight.

As shown in FIG. 3, a lower bolt receiving hole 28 is formed in each fourth bearing surface 27 so as to extend from the fourth bearing surface 27 to the corresponding wheel receiving recess 22. This hole 28 and its corresponding hole 20 of the bearing part 16 are aligned with each other so as to receive therethrough a locking bolt B when the fitting parts 15 of the frame 1 are fitted in the fitting parts 23 of the weight 2, respectively.

The following will describe a method of connecting the weight 2 to the frame 1.

First of all, as shown in FIG. 1, the weight 2 is placed below the frame 1. Then the frame 1 is lowered from above toward the weight 2. Specifically, the frame 1 is lowered in such a manner that the fitting parts 15 of the locating members 14, which are formed on the frame 1, fit respectively into the fitting parts 23, which are formed on the weight 2. That is, the frame 1 is lowered in such a manner that the side faces of the J-shaped fitting parts 15 contact the respective third bearing surfaces 23*a* of the fitting parts 23, that the first contacting portions 15*b* of the fitting parts 15 contact the respective first bearing surfaces 23*b*, and that the lower surfaces of the second contacting portions 15*c* of the fitting parts 15 contact the respective second bearing surfaces 23*c*. Since the fitting parts 23 of the weight 2 formed to open upward, the fitting parts 15 of the frame 1 can be fitted smoothly to the fitting parts 23 of the weight 2.

With the fitting parts 15 of the frame 1 fittingly received in the fitting parts 23 of the weight 2, the upper holes 25, 19 are aligned with each other and also the lower holes 28, 20 are aligned with each other. Then the locking bolts B are inserted through the aligned upper holes 25, 19 and lower holes 28, 20 from the weight side. Subsequently, the frame 1 and the weight 2 are fixed together by tightening the bolts B with nuts (not shown). Thus, the frame 1 and the weight 2 are connected to each other.

With the frame 1 and the weight 2 thus connected, the rear end 11*a* of the left side-plate 11 and the rear end 12*a* of the right side-plate 12 are placed in facing relation to the engaging parts 26 of the weight 2. Thus, the frame 1 is located appropriately with respect to the weight 2.

In the present preferred embodiment, the following advantageous effects are obtained.

(1) In the present embodiment, the fitting parts 15 and 23 are formed on the frame 1 and the weight 2, respectively, in such a manner that the upper holes 19, 25 and the lower holes 20, 28 are aligned with each other, respectively, when the frame 1 and the weight 2 are combined together. Therefore, alignment of the bolt receiving holes 19, 25 and 20, 28 can be accomplished merely by fitting the fitting part 15 in the fitting part 23. Thus, time and effort required when connecting the weight 2 to the frame 1 are reduced.

(2) In the present embodiment, the frame 1 which is relatively lightweight is lowered from above to be connected to the weight 2 which is relatively heavy and, therefore, placed below the frame 1. Therefore, no special jig is needed to support the heavy weight and connecting the frame and the weight can be accomplished without using any large force.

(3) In the present embodiment, with the frame 1 and the weight 2 combined, the rear ends 11*a* and 12*a* of the left side-plate 11 and the right side-plate 12 are placed in facing relation to the engaging parts 26 of the weight 2. Therefore, the boundaries of the frame 1 and the weight 2 are simultaneously aligned with each other. Thus, the alignment of the boundaries that is necessary for maintenance of appearance quality of forklift truck can be achieved simultaneously with connection of the frame 1 and the weight 2.

In the present invention, the following alternative embodiments are also practiced.

In the above-mentioned preferred embodiment, the frame 1 is moved from above for connection with the weight 2. In an alternative embodiment to the preferred embodiment, the weight 2 is moved so as to be connected with the frame 1. In another alternative embodiment to the preferred embodiment, both of the frame 1 and the weight 2 are simultaneously moved and connected to each other.

In the above-mentioned preferred embodiment, the fitting part 15 of the frame 1 includes the top portion 15*a*, the first contacting portion 15*b*, the second contacting portion 15*c*. The fitting part 15 is not limited, however, to the above components. In alternative embodiments to the embodiments, the fitting part 15 includes the bearing part 16 of the locating member 14 in place of the first contacting portion 15*b*. In this case, the fitting part 23 of the weight 2 includes the fourth bearing surface 27 in place of the second bearing surface 23*b*, which then constitutes the fitting part 23 of the weight 2.

In the above-mentioned preferred embodiment, the fitting part 15 and the bearing part 16 are formed integrally by the locating member 14. In alternative embodiments to the embodiments, the fitting part 15 is formed separate from the bearing part 16.

Therefore, the present examples and embodiments are to be considered as illustrative and not restrictive and the invention is not to be limited to the details given herein but may be modified within the scope of the appended claims.

What is claimed is:

1. A forklift truck comprising a frame, weight and a mounting structure for mounting the weight on the frame, wherein the mounting structure comprises:

a first hole formed through the frame;

a second hole formed through the weight;

a first fitting part formed on the frame;

a second fitting part formed on the weight in such a manner that the first fitting part is fittingly received in the second fitting part, wherein the first hole is formed in the first fitting part and the second hole is formed in the second fitting part such that the first hole and the second hole are aligned with each other when the first fitting part is fittingly received in the second fitting part;

a bolt inserted through the aligned first and second holes and a nut screwed onto the bolt for tightening it.

wherein the first fitting part comprises a horizontal top portion, a first contacting portion that continues from a rear end of the top portion and extends downward, and a second contacting portion, and wherein the second fitting part comprises a first bearing surface which is in contact engagement with the first contacting portion, and a second bearing surface which is in contact engagement with the second contacting portion, characterized in that the second contacting portion of the first fitting part continues from a lower end of the first contacting portion and extends horizontally forward, and in that the second fitting part comprises a third bearing surface which is in contact engagement with the three portions of the first fitting part.

2. The forklift truck according to claim 1, wherein the first hole is formed through the first contacting portion and the second hole is formed through the first bearing surface.

3. The forklift truck according to claim 1, wherein the top portion, the first contacting portion and the second contacting portion have substantially the same dimension as measured in a direction of width of the forklift truck.

4. The forklift truck according to claim 1, wherein the frame further comprises a bearing part that extends downward from the first fitting part and wherein the weight further comprises a fourth bearing surface contacting the bearing part.

5. The forklift truck according to claim 4, wherein the first hole is formed through the bearing part and the second hole is formed through the fourth bearing surface.

6. The forklift truck according to claim 1, wherein the first fitting part has substantially a J-shape.

7. The forklift truck according to claim 1, wherein the weight has an engaging part which faces the frame.

8. The forklift truck according to claim 1, wherein the number of the first holes, the number of the second holes, the number of the first fitting parts and the number of the second fitting parts are each two.

9. The forklift truck according to claim 8, wherein the second fitting parts are symmetrical relative to a longitudinal center line of the weight.

10. A method of mounting a weight in a forklift truck which comprises a frame and the weight that is to be connected and fixed to the frame by a bolt and a nut, the method comprising:

a first forming step of forming a first hole through the frame and a second hole through the weight in such a manner that the first hole and the second hole correspond to each other;

a second forming step of forming a first fitting part on the frame and a second fitting part on the weight in such a manner that the first fitting part and the second fitting part fit to each other, wherein the first hole is formed in the first fitting part and the second hole is formed in the second fitting part such that the first hole and the second hole are aligned with each other when the frame and the weight are combined together;

wherein the second forming step comprises forming the first fitting part to have a horizontal top portion, a first contact portion that continues from a rear end of the top portion and extends downward, and a second contacting portion, and forming the second fitting part to have a first bearing surface to be brought into contact engagement with the first contacting portion, and a second bearing surface to be brought into contact engagement with the second contacting portion;

a step of moving the frame and the weight to each other in such a manner that the first fitting part is fittingly received in the second fitting part;

a step of inserting the bolt through the first hole and the second hole from the weight side; and a step of tightening the bolt with the nut, the method being characterized in that the second forming step furthermore comprises forming the second contacting portion of the first fitting part such that it continues from a lower end of the first contacting portion and extends horizontally forward, and in that the second forming step furthermore comprises forming the second fitting part to have a third bearing surface to be brought in contact engagement with the three portions of the first fitting part.

11. The method according to claim 10, wherein the weight has an engaging part for facing the frame.

12. The method according claim 10, wherein the number of the first holes, the number of the second holes, the number of the first fitting parts and the number of the second fitting parts are each two.

13. The method according to claim 12, wherein the second forming step furthermore comprises forming the second fitting part so as to be symmetrical relative to a longitudinal center line of the weight.

14. The method according to claim 10, wherein the moving step comprises moving the weight to the frame.

15. The method according to claim 10, wherein the moving step comprises moving the frame to the weight.

16. The method according to claim 15, wherein the moving step comprises lowering the frame from above toward the weight.

* * * * *